United States Patent [19]
Yang

[11] Patent Number: 5,307,267
[45] Date of Patent: Apr. 26, 1994

[54] METHOD AND KEYBOARD FOR INPUT OF CHARACTERS VIA USE OF SEPECIFIED SHAPES AND PATTERNS

[76] Inventor: Gong M. Yang, No. 1-02, First Dong, No. 15, DongTing First Road, Wuchang Wuhan, China

[21] Appl. No.: 807,783

[22] Filed: Dec. 11, 1991

Related U.S. Application Data

[63] Continuation of Ser. No. 517,250, May 1, 1990, abandoned.

[51] Int. Cl.$^5$ .............................................. G06F 15/38
[52] U.S. Cl. ................................................ 364/419.09
[58] Field of Search ........................................ 364/419

[56] References Cited

U.S. PATENT DOCUMENTS

| | | | |
|---|---|---|---|
| 4,672,759 | 6/1987 | Docherty et al. | 434/160 |
| 4,748,443 | 5/1988 | Uehara et al. | 382/55 |
| 4,877,405 | 10/1989 | Stewart | 434/160 |
| 4,932,878 | 6/1990 | Stewart | 434/160 |
| 4,959,870 | 9/1990 | Tachikawa | 382/56 |

FOREIGN PATENT DOCUMENTS

| | | | |
|---|---|---|---|
| 86104850 | 9/1987 | China | G06FS 3/023 |
| 85100837 | 2/1989 | China | G06F 3/023 |
| 2057973A | 4/1979 | United Kingdom | B41J 3/00 |
| 2118749A | 11/1983 | United Kingdom | G06F 3/02 |
| 2158626A | 11/1985 | United Kingdom | H03M 11/00 |
| 2158776A | 11/1985 | United Kingdom | B41J 5/10 |
| 2177830A | 1/1987 | United Kingdom | H03M 11/00 |

*Primary Examiner*—Gail O. Hayes
*Attorney, Agent, or Firm*—Merchant, Gould, Smith, Edell, Welter & Schmidt

[57] ABSTRACT

A method of inputting characters and symbols on pattern element basis and a keyboard with over ten keys by means of which the characters and symbols are inputted. This input method and its keyboard can be used to input ASCII characters, Greek characters, Arabic characters, Japanese characters, Chinese characters as well as any other characters or symbols whose structure can be expressed as a combination of pattern elements, without changing the marks tagged on the key faces. It provides an easy to use, simple, general purpose and light in weight, small in size input device for computer, telephone, game machine or any digital system where a keyboard input is necessary.

11 Claims, 5 Drawing Sheets

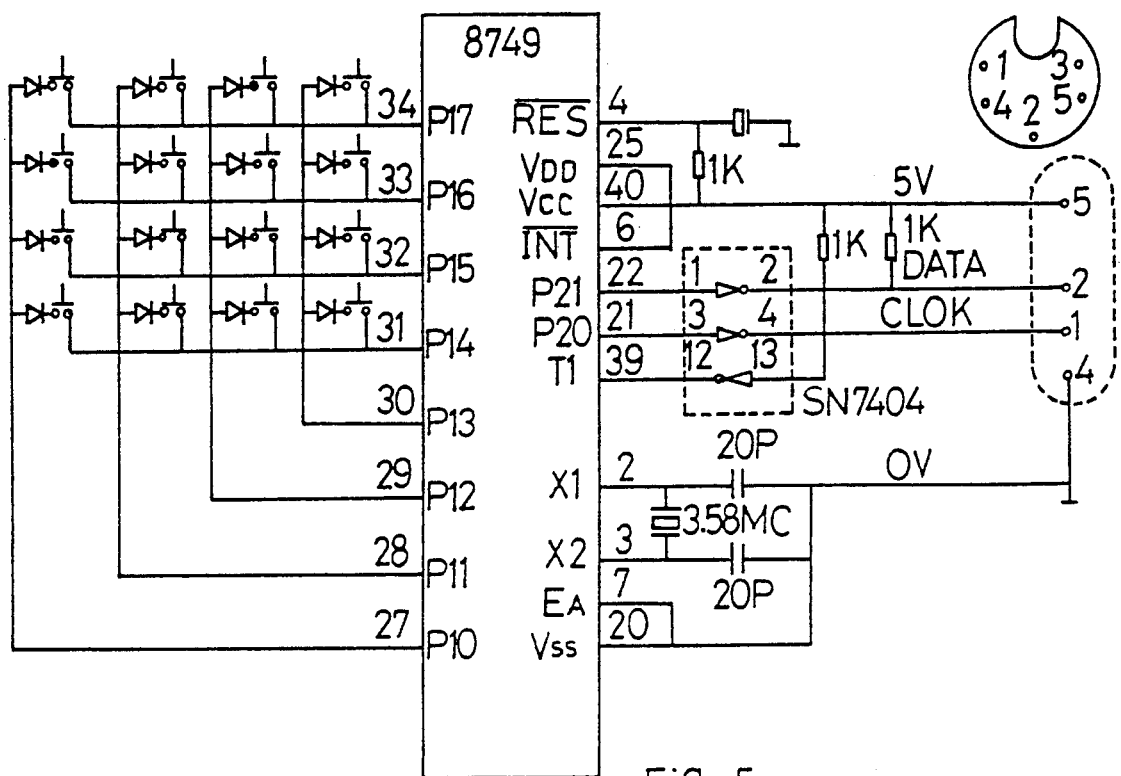
Fig·5
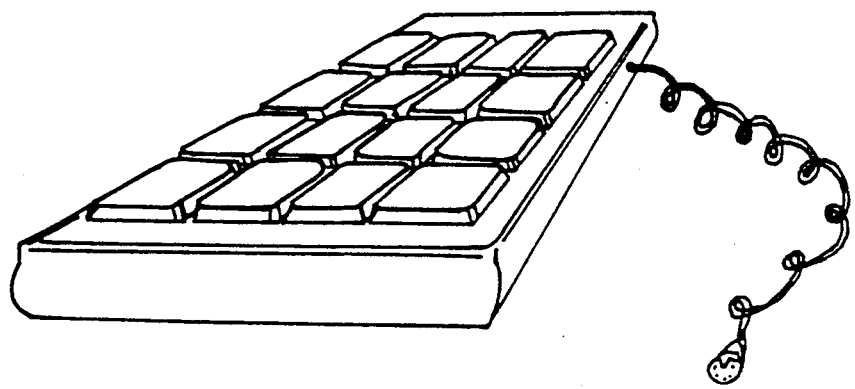
Fig·4

Fig. 6

METHOD AND KEYBOARD FOR INPUT OF CHARACTERS VIA USE OF SEPECIFIED SHAPES AND PATTERNS

This is a continuation of application Ser. No. 07/517,250 filed May 1, 1990, now abandoned.

FIELD OF THE INVENTION

The invention relates to a method of inputting characters and a device used, and particularly to the combination of structural features of characters/symbols and input of characters/symbols by taking advantage of such combinations as well as the keyboard especially designed for the method.

BACKGROUND OF THE INVENTION

The conventional computer keyboard is based on the keyboard of a standard English typewriter with several additional edit keys and function keys. Among these keyboards, the number of keys on each keyboard varies from tens to over a hundred, e.g., the keyboard of an Apple Computer has 52 keys, IBM-PC has 83 keys, and PS-2 has 101 keys, etc., and the keyboard of some computers may have even more keys. The reduction in size of the keyboard will become very difficult if it has too many keys. Or even if it was reduced, owing to the fact that the keys are located too closely, the typing operation would be hindered by frequent mistouch, this would affect the effectiveness of using the keyboard. The currently used methods of inputting characters on a conventional computer keyboard are mainly direct methods. That is, with the characters assigned to the keys respectively in one to one correspondence. Though these methods are straight forward, they have some significant drawbacks: first, with the expansion of input character set, the number of keys will also increase; and second, the marks tagged on the keys will have to be changed when the input character sets are changed. This not only brings about difficulty to the miniaturization of the keyboard but also causes inconvenience in inputting of large character sets or alteration of input character sets.

The invention entitled "An Zi Jie Multi-functional Language Processing Device on coding basis—An Zi Jie Writing Machine", as disclosed in the Chinese Patent No.: 861048501 is intended to solve this problem. It suggests a small keyboard with 20 keys. On the top of each key two letters, one numeral or punctuation mark and other pattern or script are tagged. Though the number of keys on this keyboard has been reduced, it can only input characters that are tagged on the keys in a direct way. For those characters that are not tagged on the keys, it is necessary to adopt a coding method to input them, but to memorize a large number of codes is hard work. If characters of different languages are involved, it is necessary to alter the marks tagged on the keys. This would cause even more inconvenience when characters of several different languages are to be inputted.

To input Chinese characters is a hard problem. It is even more difficult to input Chinese characters on a standard English keyboard. If inputted by phonetic codes, duplication code rate will be very high and it is impossible to type without looking at the keyboard. In order to input the Chinese characters by structural coding method, over six hundred Chinese character parts are to be distributed to and tagged on the keys respectively. Owing to the large number of the parts involved, the keyboard can not hold them. But we may select out of them about 100 or so frequently used parts and tag them to the letter and numeric keys thus the input of Chinese characters can still be carried out by structural coding method on a conventional keyboard. The invention entitled "Optimized Five-stroke Coding Method and Its Keyboard", as disclosed in Chinese Patent for invention No.: 85100837 works in the following way. Since one letter is used to represent several parts, duplication codes are unavoidable when a number of different parts are being used to code a character. In order to reduce duplication codes, it is necessary to adjust the combination of parts on each key and this will surely lead to a situation where the parts tagged on a single key are quite different to each other in shape. This makes it difficult to remember the locations of more than one hundred parts on the keyboard. Five-stroke coding method lists more than one hundred and ninety frequently used parts. It is necessary to remember mechanically all parts represented by the letters. The problem of duplication code still exists and it is necessary to distinguish the duplication codes by combining "pattern" and "last stroke" to form an identification code. It is very inconvenient to operate.

It is likewise inconvenient to input the graphical symbol by a standard English keyboard, on which there are no proper elementary patterns suitable for constructing graphical symbols tagged. In order to input a designated graphical symbol (for example, the symbol of a transistor), it is necessary to use a letter or a numeral to stand f or it. If we tag the graphical symbol to be inputted on the keys, then it would be troublesome to change to a different set of graphical symbols. If the correspondence relationship between graphical symbol and its designated numeral is displayed on the screen, the screen space available for the user would be smaller.

OBJECTS OF THE INVENTION

The present invention has two purposes, one is to provide an intuitive, general purpose and flexible method with which characters of different languages, such as English, Russian, Arabic, Japanese, Korean, Chinese etc., as well as graphical symbols can be inputted. Another is to provide a keyboard with only a dozen or so keys. Using this keyboard, we can input the characters of French, German, Russian, Arabic, Japanese, Korean, Chinese and ASCII characters and various graphical symbols without altering the marks tagged on the keys and mechanical memory is not needed.

SUMMARY OF THE INVENTION

For a conventional computer keyboard, large input character set leads to large number of keys. To alter the input character set, the corresponding marks tagged on top of the keys have to be changed. Study shows that, though the character set varies from language to language, they can be considered as being composed of some basic patterns like ☐ ⊔ ⌐ | . , etc., and different characters are composed of different number and orientation of the simple patterns. If these simple patterns and their possible orientations which may appear in the various characters are tagged on the keys, it is possible to directly identify which keys are struck according to the shape of the character without the need of mechanically remembering the codes, and it is also not necessary to alter the marks tagged on the keys for inputting characters of multi-languages. A "space" character is added to facilitate the input of character strings. We use a square of dotted line ⊡ to represent it. In order to indicate whether the combination of two character components is an upper and lower structure or a left and right structure, we need a character indicating combination mode, for example, a double square of dotted line ⊡ can be used to show that two character components are combined in a left and right structure. In this way, we can tag the possible orientations of the patterns, □ ⊔ L | ., ⊡ ⊡ etc., which may appear in the characters on to the keys, and input a character by striking the keys according to the combination of patterns.

Notice that the pattern ⊔ has four possible orientations that may appear in a character i.e., ⊔ ⊓ ⊃ ⊂ ; pattern | has four possible orientations | — / \ ; pattern ⌐ has eight different orientations ⌐ ⌐ ⌐ ⌐ ∨ ∧ < > ; and patterns □ ⊡ ⊡ . , have only one possible orientation respectively. All of them can be regarded as the basic element of which characters are composed — we call them pattern elements and all the characters can be regarded as a combination of these pattern elements, thus characters can be inputted by striking keys according to combination of pattern elements.

There are altogether 21 pattern elements as described above. If one key is tagged with one pattern element, 21 keys are needed. To reduce the number of keys, one key can be tagged with two pattern elements. Nine pattern elements of ⌐ ⌐ ⌐ ⌐ ∨ ∧ > <, can be considered as one group. Their common feature is that they all have an angle, thus each of them can be called angle pattern element. When they are paired up with ⊔ ⊓ ⊃ ⊂ | — / \ . (9 of them), and with an addition of an "angle" pattern selection key, the 13 keys can perform the functions performed by 21 keys. Consequently, with 12 keys tagged with 9 pairs of patterns ⊔ ⊓ ⊃ ⊂ ⌐ ⌐ ⌐ ⌐ ; and 3 patterns □ ⊡ ⊡, together with an additional "angle" pattern selection key, we can input all characters.

For convenience of remembering and locating the positions of the pattern element keys, the 12 pattern element keys can be arranged in an array of 3 rows and 4 columns, with □ key in the middle, ⊔ key above it, ⊓ key below it, ⊃ key on the left, ⊂ key on the right, ⌐ key at its upper left side, ⌐ key at its upper right side, ⌐ key at its lower left side and ⌐ key at its lower right side. These 9 pattern keys are just arranged as a "#". Because of the symmetrical arrangement, the positions of keys are easy to be remembered. To the right side of this # are arranged three symbol keys ; ⊡ ⊡, as illustrated in FIG. 1.

Though characters are all composed of line segments the distinction between the various characters resides not in the shape of lines, but rather in the feature of the space defined by the lines. For example, letter A can also be written as ⊓. This is because both of these figures are composed of a figure with closed area and an open space with a downward opening. Though the numbers of line segments that constitute them are different, they would still be identified as letter A. For further example, the numeral 8 can also be written as ⊟ (as shown in a 7-segment digital display). Though one of them is formed by curved line while the other by straight line segments, they will still be recognized as the numeral 8. In characters, the circle ○, the square □, the semi-circle D and the triangle △ and other closed figures sometimes can be recognized as the same figure. They all define a closed area and can be represented by the pattern element □.

For example, the numeral 9 may be written as ⊓ to represent the circle element by a square, the letter D may be written as ⊐ to represent the semi-circle by a square, and the letter A may be written as ⊓ to represent the triangle by a square.

To obtain satisfactory results in inputting characters and symbols by means of combination of pattern elements, certain rules must be observed and right methods employed.

First, the characters and the symbols should undergo a preprocessing of "set separation" and "branch cutting":

Set separation — to separate the characters into several relatively independent sets, and to process each set separately. For example, character "+" stands for plus sign on ASCII keyboard, while in Chinese characters, it stands for the numeral 10. So Chinese character set and ASCII character set should be distinguished to avoid ambiguity.

Branch cutting — to remove the non-essential information of characters. The magnitude of the angle included between two line segments does not matter much: it is substituted by right angle. The letter "Z" if written as "ㄋ", Chinese character "乃" as "ㄇ" and Japanese "ノ" as "ㄱ" will not cause confusion in their respective character sets. The small hook of some of the lines is also dispensable. For example, if Chinese character "才" is written as "才", and Japanese "է" as "է", it will not cause confusion. For the convenience in decomposing the character into pattern elements series, it is also necessary to change the curved lines in the character to straight lines and to depict the character in the form of a checked designated form. The designated forms for frequently used ASCII characters are listed below:

A b C ⊐ E F 5 H I J K L M n σ P Q R
S T U V W X Y Z ' Ξ ≡ Ψ 5 6 7 8 9 0 + -
* / ∧ \ > < = % · , : ; " ! ? ' [ ] ( )
{ } ~ ⊡ 5 & #

When combination of pattern elements is used to stand for a character, an essential prerequistite is decomposition of the character. To ensure the uniqueness of the decomposition, the following rules should be followed:

Taking the bigger — the figure first to be cut off should include the line segments as many as possible, for example, "±" should be cut off into "+" and "—", rather than "⊥" and "⊥".

There are four ways of decomposing a character:

Line taking out—to take a certain line in a character out of intersecting lines, so that the character is divided into two parts. This is called a decomposing method of characters by line taking out. For example, if the vertical line is to be taken out from the symbol "+", the symbol will be divided into two parts, as "|" and "—". If the middle vertical line to be taken out from the Chinese character "中", that character will be divided into two parts, as "|" and "日".

Line breaking—to break a certain line in a character at the intersecting point with other lines, so that the character is divided into two parts. This is called a decomposing method of characters by line breaking. For example, to break the vertical line in the symbol "+" at the intersecting point, that symbol will be decomposed into two parts, as "⊥", and "|", or into "|" and "┬". If both the vertical and horizontal lines are to be broken at the intersecting point, that symbol will be decomposed into two parts, as "⌐" and "┌", or into "┐" and "└".

Line dissecting—to dissect a certain line in a character, the character is decomposed into two parts. This is called a decomposing method of characters by line dissecting. For example, to dissect the vertical line in the symbol "+", that symbol will be decomposed into two parts, as "⊣" and "⊢". To dissect the horizontal line in the character "H", that character will be decomposed into two parts, as "⊔" and "⊓". The resulting patterns after decomposition by line dissection of the character still retain their original separate structural features. The structural features of each character differs from each other, so that the resulting pattern element series after decomposition by line dissecting are also different. Therefore the rate of duplication code of decomposition by line dissecting is very low.

Mixed cut—a mixture of uses of the three methods mentioned above. For example, the character "丰" is first divided into "ヨ" and "丰", and "丰" is broken into "+" and "一", finally, "ヨ" is cut into "コ" and "⊐".

Decomposition should be carried out according to the rule of first upper then lower, first left then right and first outer then inner, otherwise the results obtained would not be unique. Arrangement should also be in this order, otherwise it can not reflect the correct relative positions of the various parts of the character, for example, the character "花" should be decomposed into "++", "亻" and "匕" according to the rules of first upper then lower, and first left then right, the character "国" should be decomposed into □ 三 . according to the rule of first outer then inner, and the character "囚" should be decomposed into □ 人 according to the rule of first outer then inner, and the character "秉" should be decomposed into 禾 ⊐ 匕 according to the rule of first upper then lower. If the same character is to be decomposed by different methods and different pattern element series are obtained, generally the shortest series or the series which can best reflect its structural features is selected to be its representative pattern element series.

For some complicated characters the resulting pattern element strings from the decomposition are abnormally long. If all of the pattern elements are to be inputted, there will be too many key-strikings and the input speed will be too low. In order to increase the input speed, the number of pattern elements inputted should be reduced, but it should be ensured that no duplicate codes result. For example, the Japanese katakana "木" can be decomposed into four pattern elements — | / \ by the method of "line taking out". For the character set of katakana, taking three pattern elements — | \ as representative will cause no duplicate code. The Greek letter "Θ" can be decomposed into three pattern elements □ ⊔ ⊓ by the method of "line dissecting", and if only two pattern elements □ ⊔ are selected to represent it, duplication code will seldom occur.

A character will be decomposed into a series of pattern elements, and which elements should be inputted in sequence. In so doing, the number of keystriking would be too large and the speed of input too slow. In order to increase the speed of keyboard input, several keys can be pressed simultaneously, thus several pattern elements are inputted at the same time. But the sequence information of the pattern elements will be lost, and the loss of sequence information will cause duplication codes. For ASCII character set, this loss of information will not cause duplication code, so it is possible to input a character by a simultaneous strike of keys.

The symbol ⊡ indicates that two pattern elements are concatenated side by side, and can also be assigned with a new meaning, "repeat", making the input faster. For example, the Greek letter "Ξ" can be decomposed into four pattern elements ⊓ ⊔ ⊓ ⊔. We can use ⊓ ⊔ ⊡ to represent it instead of typing ⊓ ⊔ two times and similarly E can be represented by ⊏ ⊡ ASCII characters are mostly simple in structure. For some of the characters, its designated form itself is a pattern element, and pattern element is the representative pattern elements of that character, for example, characters C, J, L, N, O, V, U, V, I, . . . If the method of line dissecting is used to decompose the designated form of ASCII characters, most of the characters are divided into pattern elements. These pattern element series are their representative pattern element series, for example, characters A, b, D, E, F, g, H, I, P . . . For some of the characters, the number of the resulting pattern elements from decomposing by the method of line dissecting, exceeds two, but by the method of line breaking the resulting number of pattern elements is two. These pattern element series are their representative pattern elements series, for example, K, M, R, W, X, Y . . . Very few characters can be decomposed into two pattern elements by the method of line taking out, for example, the character Q. To decompose it by the method of line taking out, its representative pattern element series are obtained. For some of the relatively complicated characters, such as the symbols *, %, $, &, #, the number of the resulting pattern elements by the three decomposing methods all exceeds two. In this case, two of the pattern elements which reflect its structural form are taken from a pattern element series to be the representative pattern element series of that character. It will be known from decomposing ASCII character set that the representation of letter B is the same as for numeral 8. To distinguish them, one of the characters is to be replaced by small letter or in handwriting form, for example, N to be replaced by n, O by σ, B by b and G by g. As for the numerals 5 and 2, they are concatenated by two pattern elements ⊏ and ⊐ vertically, only the up and down sequence is reversed. If input order is not observed during keystriking, duplication code will occur, but there is only this pair of duplication code. If 5 is decomposed by the method of "line breaking", the code will be ⊏ ⊐ , the problem of duplication code is solved. The above mentioned method makes input of ASCII characters simpler and easier and it is possible to key in two pattern elements simultaneously, so that the speed of input is increased. Some of the letters are composed of one pattern element (such as C). If only one pattern element is inputted, the computer can not determine whether the inputted pattern element "⊏" represents one letter or is part of a string. To avoid ambiguity, a space character ⊡ should be adopted. Generally, we only refer to capital letters in the process of decomposition, but for B, G, N, O, only small letters (or handwriting form) are used in the process of decomposition. To aid remembering, a formula "NO BIG" can be used to associate the four letters.

The results of decomposition of ASCII character set are listed below:

| Letters | A | B | C | D | E | F | G | H | I | J |
|---|---|---|---|---|---|---|---|---|---|---|
| Designated forms | A | b | C | D | E | F | G | H | I | J |
| Representative pattern elements | ⊡ ⋂ | L ⊡ | C | ⊐ ⊡ | C | C ⌐ | ⊡ | U ⋂ | ⊐ C | J |
| Combination mode | | | | ⊞ | ⊞ | | | ⊞ | | |

| Letters | K | L | M | N | O | P | Q | R | S | T |
|---|---|---|---|---|---|---|---|---|---|---|
| Designated forms | K | L | M | N | O | P | Q | R | S | T |
| Representative pattern elements | I < | L | ∧ | ⋂ | ⊡ ⌐ | ⊡ ⌐ | ⊡ \ | ⊡ ∧ | J ⌐ | ⊤ ⌐ |
| Combination mode | ⊞ | | ⊞ | | ⊞ | | | ⊞ | ⊞ | ⊞ |

| Letters | U | V | W | X | Y | Z |
|---|---|---|---|---|---|---|
| Designated forms | U | V | W | X | Y | Z |
| Representative pattern elements | U | V | V ∧ | V I | V L | ⌐ |
| Combination mode | | ⊞ | | | ⊞ | |

| Numerals | 0 | 1 | 2 | 3 | 4 | 5 | 6 | 7 | 8 | 9 |
|---|---|---|---|---|---|---|---|---|---|---|
| Designated forms | 0 | 1 | 2 | 3 | 4 | 5 | 6 | 7 | 8 | 9 |
| Representative pattern elements | 0 | 1 | ⊐ C | ⊐ ⌐ | U ⌐ | C J | C ⊡ | ⌐ | 0 | 0 ⌐ |
| Combination mode | | | | ⊞ | | | ⊞ | | | |

| Operators | + | – | * | / | ∧ | \ | > | < | = | % |
|---|---|---|---|---|---|---|---|---|---|---|
| Designated forms | + | – | * | / | ∧ | \ | > | < | = | % |
| Representative pattern elements | ⌐ ⌐ | – | V – | / | ∧ | \ | > | < | – | ⊡ / |
| Combination mode | | | | | | | | | ⊞ | |

| Punctuation marks | . | , | : | ; | " | ! | ? | ' | [ | ] |
|---|---|---|---|---|---|---|---|---|---|---|
| Designated forms | . | , | : | ; | " | ! | ? | ' | [ | ] |
| Representative pattern elements | . | , | . . | . , | " , | I \ | ⌐ / | ' ⊡ | [ ⊡ | ] ⊡ |
| Combination mode | | | | ⊞ | ⊞ | | | ⊞ | ⊞ | ⊞ |

| Punctuation marks | ( | ) | { | } | | | | | | |
|---|---|---|---|---|---|---|---|---|---|---|
| Designated forms | ( | ) | { | } | | | | | | |
| Representative pattern elements | < > | > | – C | ⊐ – | | | | | | |
| Combination mode | ⊞ | ⊞ | ⊞ | ⊞ | | | | | | |

| Special symbols | ~ | @ | $ | & | # |
|---|---|---|---|---|---|
| Designated forms | ~ | @ | $ | & | # |
| Representative pattern elements | ∧ V | ⊡ U | ⊡ C | ⊡ < | U ⊡ |
| Combination mode | ⊞ | ⊞ | ⊞ | ⊞ | |

The shape and structure of Chinese characters are very complicated, but they can be summed up to be composed of five strokes, namely, horizontal stroke "—", vertical stroke "|", left-falling stroke "/", right-falling stroke "\" and turning stroke "∨". We use 1, 2, 3, 4, 5 to represent them respectively. With these five strokes, and by typing in the code of the strokes in the normal order of writing, Chinese characters can be inputted. The method of "5 keys for 5 strokes" works in the following way. The 21 pattern elements of the invention includes not only the five strokes, but some combination of them as well. For example, the pattern element "⊡" is the combination of the three strokes | ⌐ —. Therefore, Chinese characters are decomposed by the method of "line taking out" into an ordered set of the 21 pattern elements, and we can input the corresponding pattern elements in normal writing order. In this way, the input of Chinese characters is done. We call this "Method of inputting Chinese characters on pattern elements basis". For example, the character "㑒" is decomposed into six strokes, | ⌐ — | ⌐ — but it can also can be decomposed into three pattern elements ⋂ — ⊡. The code length of the latter is only a half of that of the former, the speed of input is higher and the rate of duplication code is lower.

It is very troublesome to input complicated Chinese characters even by the pattern elements based method. In order to increase the speed for inputting Chinese characters, the frequently used combination of strokes of Chinese characters can be defined as a Chinese letter, each letter being composed of two pattern elements. On the keyboard of pattern elements, one letter is keyed in each time and the letter can be taken as an independent code unit for Chinese characters code. According to the normal order of writing for Chinese characters and in observance of the rule of first upper then lower, first left then right and first outer then inner, the Chinese character can be decomposed into an ordered set of letters and pattern elements, the various letters and pattern elements are then typed in sequentially and the input of Chinese characters is done. This can be called letter based input method for Chinese characters. After analyzing, abstracting and classifying the various combinations of Chinese character strokes, we obtain the following 56 letters for Chinese characters:

```
⊥ i ⁄ ⟨    ḣ L ⌐ ⌈    ⁄ ⌐ ⁄⁄ ⋀    ⌐ ⁄⊥ ⌐ ⌈
⊥⊤⌐⊢     ⨆ ⨅ ⌐ E    ⊢ ⋂ ⊐ ⊏    ⊢ ⊥ E ⊡
⊥ ⁄⋀ ⋋ ×   = ⃦ ⋋ ⌐    ⊥ ⊢ ⋔ ⌐    ⌐ ⋋ ⊬ ⊢
E ⊃ ⊏ P   ⌐ ⋂ ⊥ ⌐
```

They are as simple as the English alphabet. Because they are symmetrical in structure, the rules are simple and clear and easy to remember.

A letter or a pattern element can represent several combinations of strokes which are similar to each other in shape. Their correspondence relationship is as follows:

```
—  ——  —         |  ——  | ⌐ ⌐ ⌐ ⌐
/  ——  / ⁄        \  ——  \
⌐  ——  ⌐          L  ——  L ⌐ ⌐
⌐  ——  ⌐ ⌐ ⌐ ⌐    ⌐  ——  ⌐ ⌐ ⌐
V  ——             ∧  ——  ∧ ⋀ ⋀
>  ——             <  ——  <
⊔  ——  ⊔          ⋂  ——  ⋂ ⋂ ⋂ ⋂ ⋂ ⋂
⊐  ——  ⊥          ⊏  ——  ⊏ ⊏ ⌐
⊡  ——  ⊡          ,   ——  ⋰ ⋰
⊥  ——  ⊥ ⊥        ⁞   ——  ⊢ ⌐ ⊢
⁄  ——  ⁄          ⟨   ——  ⟨ ⟨ ⟨
ḣ  ——  ḣ ⊅         ⌐   ——  ⊥ ⌐ ⊔
⌐  ——  ⌐ ⌐ ⌐ ⌐    ⌐   ——  ⌐
⊥  ——  ⌐ ⌐ ⌐      ⌐   ——  ⌐ ⌐ ⌐
⁄⁄  ——  ⁄ ⁄⁄      ⋀   ——  ⋀ ⋀ ⋀ ⋀
⌐  ——  ⌐          ⁄L  ——  ⁄⌐ ⌐
⌐  ——  ⌐          ⁄   ——  ⌐ ⌐ ⌐
⊥  ——  ⋀          ⊤   ——  ⊤ ⊤
⌐  ——  ⌐          ⊢   ——  ⊢
⨆  ——  ⨆ ⊬         ⨅   ——  ⊬ ⊬
⊐  ——  ⊢ ⊥ ⌐ ⌐    E   ——  E ⊢ ⊢ ⌐
⊬  ——  ⊬          ⊢   ——  ⊢ ⊥ ⊏
⊃  ——  ⊥ ≠ ⊬      ⊏   ——  ⊬ ⊬ ⊬ ⊬
H  ——  ⊬ ⊬        I   ——  ⊥
B  ——  ⊨          ⊡   ——  ⊢
+  ——  ⌐          ⨯   ——  ⌐
```

For Chinese characters with simple and clear structure, direct decomposition is appropriate. For example, For Chinese characters with intercrossed structure, it is relatively simple to decompose them by the method of "line taking out". For example, For Chinese characters with similar shapes and structures it is appropriate to decompose them by the method of "line breaking" and in observance of the rule of "taking the bigger". For example, For Chinese characters with complicated structure, the method of "mixed cut" should be used, for example, An assembly of strokes which is more complicated than the letter is called a character root such as " 弓、月、缶、亘 " etc. In order to further increase the speed for inputting Chinese characters, frequently used character roots need not be decomposed. Instead, a character root can be represented by several of its pattern elements that can best describe its structure. A character root can be inputted by typing in all the representative pattern elements of the character root simultaneously. These character roots hence are regarded as the independent code unit of the Chinese character input codes. For briefness of description, the term "character root" refers only to the 32 assemblies of strokes. In accordance with the normal writing order of the Chinese character or its structural sequence, each Chinese character is to be decomposed into an ordered set of a series of character roots, letters and pattern elements, and these character roots, letters and pattern elements are typed in successively to input Chinese characters.

This can be called character root based input method for Chinese characters.

According to the frequency of use, 32 assemblies of strokes are selected as indecomposable independent character roots. Their representative pattern elements are shown as follows:

For easiness of remembering, these 32 character roots can be divided into 8 categories. The character roots in these categories relate to 8 different aspects of our daily life and real world (according to their meaning in Chinese) respectively. The 8 aspects are human beings, organs, utensils, animals, materials, earth, nature and status.

王女行立、心目扌足、车门弓戈、马鱼隹豕、
金贝木竹、曰土石雨、氺火西月、大小囗白。

Assemblies of strokes with similar shape and structure can be merged, for example, "止、小" can be merged with "⺅", "⺆", "⺈" can be merged with "月".

By taking advantage of character roots, we can greatly shorten the code length for Chinese characters, for example:

妩 ——— 女大弓    想 ——— 木目心
洞 ——— 氵门王    德 ——— 彳十四一心
雕 ——— 冂土口隹   琼 ——— 王亠口小

As the structure of some Chinese characters is simple while that of others is complicated, the code length for individual Chinese character is thus variable. If the computer is intended to be able to distinguish the two Chinese character codes consecutively inputted, it is necessary to key in a "space" character after one Chinese character code is inputted.

According to the statistics disclosed in the "Dictionary of Chinese characters Information" compiled by the research group of Chinese Character Coding, Shanghai Jiao Tong University, every Chinese character can be constructed out of 623 parts of different shape and structure. Each Chinese character is a planar combination of these parts. The number of parts each Chinese character comprises and the combination pattern of the parts are different from character to character. If the planar combination of the parts can be transformed accurately to a linear combination of a series of numeral codes, the uniqueness for input of Chinese characters can be achieved. For this sake, the codes of the various parts must be different and the relative positions of the parts must be completely expressed by codes. The relative positions of the parts might be correctly expressed by means of brackets "( )", horizontal combination symbol "⫶⫶" and enclosure symbol "⊡" (the combination of "□" and "."). For example, the character "灞" is composed of 4 parts. According to the order of first upper then lower, first left then right, and first outer then inner, this character can be expressed by the following linear expression:

氵(雨(革⫶⫶月))

Similarly, the expression for "国" is □(王) and the expression for "疾" is: 疒 ⊡ (禾攵).

If the codes for these symbols are typed in according to the expression, the uniqueness of Chinese character input will be ensured. From this string of codes, a computer can make out the corresponding Chinese character out of the 623 parts.

All the 21 pattern elements, 56 letters and 32 character roots are called Chinese character parts. They all have different codes--altogether 109 independent code units. These parts are called independent parts. They are about one sixth of all Chinese character parts. All other non-independent parts can be decomposed into the combinations of character roots, letters and pattern elements. For example, the part "鸟" can be decomposed into "勺丷—";" 里" can be decomposed into "曰土", and "角" can be decomposed into 勹月丨.

This is actually the way to code 514 non-independent parts with the 109 code units. Duplication of Code can be eliminated when two code units are used to represent one part. If pattern element "," is used to represent the bracket, 21 pattern elements can carry out the unique input of Chinese characters.

For most Chinese characters, omission of bracket, "⫶⫶" symbol and enclosure symbol "⊡" will not cause duplication code. There are exceptions for a very few characters. For example, for the characters "夙" and "凡", the code of symbol "⫶⫶" can not be omitted. Likewise, for the characters "囚" and "呆", the symbol "⊡" can not be omitted. Since these exceptional cases are very few and considering that the omission can increase input speed. We suggest to use the omissions as often as possible.

There are 6,763 frequently used Chinese characters. Each character is composed of 3 parts on average. The number of combination of the three parts is approximately $4 \times 10^7$. These frequently used Chinese characters are only two ten-thousandth of the different combinations of the three parts. Redundancy of input code for Chinese characters is great. The input codes can be further compressed. For example, for Chinese characters that have long code lengths, the input can be restricted to at most 3 to 4 codes, adopting a method of one, two, three, final or primary, secondary, final to fetch the code, and to omit some of the codes in between. In so doing, the duplication codes might be increased. But an operator skilled in the art can remember the characters with duplication code and will add input code correspondingly for the character with duplication codes.

For most frequently used characters, decomposition is unnecessary. They may be represented by pattern elements that can describe best their structure characteristic; the representative pattern elements can be typed in simultaneously to realize the high speed input of Chinese characters. For example,

是 ——— 口\    不 ——— —|/·   在 ——— —/|⫶⫶    衡 ——— 口⫶

Their codes are different from the codes of all the letters and character roots. They can be distinguished without the use of "space" character. Therefore it is possible to key in a character simultaneously.

There are four categories of structures of the Chinese characters:
1. Mono-structure
  For example, 串、果、更、开、习
2. Left and right structure
  For example, 明、创、悟、判、飙
3. Upper and lower structure
  For example, 卡、意、宜、悲、攀
4. Inner and outer structure
  For example, 国、同、匣、辰、冈

All the letters and character roots are considered to be mono-structure. structure.

The procedure of inputting Chinese characters by the character roots method is shown in FIG. 7.

As illustrated in FIG. 7, the whole procedure is divided into 4 parts.

The first part:

Character analysis — If the character is a frequently used one, then enter 4: fetch its code and the procedure is over. Otherwise, goto 2 for further processing.

The second part:

Structure analysis — through the analysis 2, 5, 6, the category of structure of the character is to be determined, and then which part of the character is to be decomposed is determined. After this, the part resulted from the decomposition is to go through a further analysis to see whether it can be further decomposed until the part that has been decomposed is of a mono-structure.

The third part:

Part fetching — through three analysis 3, 7, 8 to determine what kind of code (pattern element, letter, character root) is to be fetched for the mono-structure. If the code can not he fetched directly, then the mono-structure will go through a further decomposition.

The fourth part:

Decomposing the mono-structure — through two analysis 9, 10, we can decide which method should be used to decompose the mono-structure. After the decomposition, one of the resulted parts is to be taken to part fetching process. After the code is fetched the remaining part will be sent to analysis 2 for structural analysing. If the part is a mono-structure, then it should be sent to 3 for fetching code analysis. This process will go on until the mono-structure is completely decomposed.

The following examples illustrate the process:

"口" — (1) frequently used character? no — (2) mono-structure? yes — (3) pattern element? yes — (4) fetch its code.

"果" — (1) frequently used character? no — (2) mono-structure? yes — (3) pattern element? no — (7) letter? no — (8) character root? no — (9) Take out line? no — (10) breaking line? yes — (12) fetch the upper "田" (3) pattern element? no — (8) character roots? yes — (4) fetch the code of "田" — (2) the remaining "木" is mono-structure? yes — (3) pattern element? no — (7) letter? no — (8) character root? yes — (4) fetch the code of "木".

"刮" — (1) frequently used character? no — (2) mono-structure? no — (5) left and right structure? yes — (13) fetch the left part "舌" — (2) mono-structure? no — (5) left and right structure? no — (6) upper and lower structure? yes — (4) fetch the upper part "立" — (2) mono-structure? yes — (3) pattern element? no — (7) letter? no — (8) character root? yes — (4) fetch the code of "立" — (2) the remaining "口" on the left is a mono-structure? yes — (3) "口" is a pattern element? yes — (4) fetch the code of "口" — (2) "刂" on the right is a mono-structure? yes — (3) pattern element? no — (7) letter? yes — (4) fetch the code of "刂".

The whole decomposition procedure looks very complicated, but actually there are only eight kinds of structures for frequently used Chinese characters:

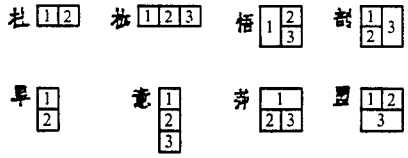

Decomposition and code fetching should observe the order illustrated above.

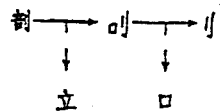

After practicing it repeatedly and becoming experienced and skilled, one can readily decompose the character "刮" into "立" "口刂". Input and decomposition can be done simultaneously. This is just like the learning process when a man is writing. He never considers, at the time he begins the first stroke, where the next stroke will begin, in what direction and how long it will be, etc. Once a habit is formed, every action becomes natural.

If the letter based input method is used to input Chinese character, the decomposition procedure is just the same as that of the character root based input method, only that it is not necessary to judge whether a part is a character root. When pattern element based input method is used, it is not necessary to judge whether a part is a letter or a character root.

As the phonetic letters of Chinese characters are expressed by English alphabets, naturally, they can be directly entered by means of a pattern elements keyboard. But the current phonetic letter based inputting methods for Chinese characters are all designed for use on English keyboards, which does not make full use of the advantages of Chinese language and the speed of keying in is too low. For example, the phonetic letters for the character "光" is "guang". As it ends in "g", a consonant, the demarcation between the characters is not clear and definite, a space character is needed for a demarcation line. Altogether we need six key-strikings to input the character "光".

The Chinese vowels are constructed out of the following 8 letters (or string) a, o, e, i, u, ü, n, ng. If each of the 8 letters (or string) is represented by a pattern element, all the vowels can be expressed by the pattern elements as shown below:

| Vowels | a | o | e | i | u | ü | n | ng |
|---|---|---|---|---|---|---|---|---|
| Pattern element | / | □ | ⊐ | \| | ⊔ | — | ⊓ | \ |
| Vowels | ai | oi | ei | ii | ui | üi | ni | ngi |
| Pattern elements | /\| | ⊐\| | /□ | ⊔⊔ | /⊓ | ⊐⊓ | /\ | ⊐\ |
| Vowels | ia | ie | iao | ioe | iai | iu | iui | ingi |
| Pattern elements | \|/ | \|⊐ | \|/□ | \|⊐⊔ | \|/⊓ | \|⊓ | \|/\ | \|⊐\ |
| Vowels | ua | uo | uai | uei | uau | uiu | ungi | uci |
| Pattern elements | ⊔/ | ⊔⊐ | ⊔/\| | ⊔⊐\| | ⊔/⊓ | ⊔⊐⊓ | ⊔/\ | ⊔⊐\ |
| Vowels | üe | üai | üe |  |  |  |  |  |
| Pattern elements | —⊐ | —/⊓ | —⊓ |  |  |  |  |  |

Among them, the pattern elements for "ai" and "ia", "ei" and "ie", "ou" and "uo" are the same, but the sequence is different. In order to facilitate the input of one vowel at one strike of the keys, the sequence information must be cast away. This will cause duplicate codes. In order to eliminate duplication codes, after the three vowels "ia", "ie", "uo", a pattern element "⌐⌐" is added. Their last letters all comprise an enclosed pattern "□". It is easy to remember.

Thus it can be seen that the representative pattern elements of all the vowels will not exceed three. It is possible to press down three pattern element keys simultaneously to input one vowel at one strike of the keys. Since every Chinese character has only one vowel and the vowel always appears at the end of the phonetic letters, the demarcation between words is very clear so that no space character is needed. Therefore it needs only two key strikes to input the character "光". The number of key-striking is reduced by two-thirds and the speed of input doubles.

If Chinese characters are inputted by employing words and expressions, it is only necessary to add a space character at the end of the words or expressions. As the code lengths of words and expressions are comparatively longer, the duplication codes rates will be substantially reduced. This will give full play to the information richness of Chinese characters and makes it possible to input Chinese characters faster than the input of English words.

To input a consonant with only one key-striking, three symbols "⊣ㄓㄣ" are used to represent the three consonants "zh, ch, sh", and the capital letter T is used to represent the consonant "t". The following results are obtained by means of the decomposition method of "line dissecting":

| Consonants | ㄅ | ㄆ | ㄇ | ㄈ | ㄉ | T | ㄋ | ㄌ |
|---|---|---|---|---|---|---|---|---|
| Pattern elements | ㄴㅁ | ㅁr | ⁿ⊡⁻ᴄ | ᴊᴄ | ⁻ᴛ⁻ | ⁻ᴛ⁻ | ⁿ | ㄴ |

| Consonants | ㄍ | ㄎ | ㄏ | ㄐ | ㄑ | ㄒ |
|---|---|---|---|---|---|---|
| Pattern elements | ㅁ⊃ | ⎡⎤ㄴㄱ | ⌐⊃ | ⊃- | ⊂⊃ | ᵥ∧ |

| Consonants | ㄓ | ㄔ | ㄕ | ㄖ | ㄗ(ɪ) | ㄘ(ɪ) | ㄙ(ɪ) |
|---|---|---|---|---|---|---|---|
| Pattern elements | ㄱ | ㄷ | ⎘⎚ | ⎕ | ⌐ | ⌐ᴄ | ᴌᵣ |

The total number of vowels and consonants of the Chinese characters is 56. The combination of their representative pattern elements are all different from each other. There is no duplication code. It is possible to input a vowel or a consonant at one time.

Five pattern elements "— / \ | ." are used to represent respectively the five tones namely, level tone, falling-rising tone, falling tone, entering tone and light tone. The tone symbol will be inputted following each vowel. Notice that the pattern elements for the four tone symbols are identical to the representative pattern elements of the vowel symbols "ü, a, ng, i". But if it is guaranteed that tone symbol must be inputted for every character, then no confusion will be caused and this can further reduce the duplication code rate.

Most currently used coding methods for inputting Chinese characters, such as intonation coding method, structure coding method, intonation and structure coding method, structure and intonation coding method and five-stroke coding method are designed for use on a English keyboard, and in most cases, one letter or numeral is used to represent a vowel, a consonant or several Chinese character parts. Since the keyboard of the invention can be used to input all letters and numerals intuitively, all these currently used inputting methods can be adopted with the keyboard of the invention as their corresponding hardware.

The keyboard can also be used to input French, Russian, Arabic, Japanese and Korean characters. If only 21 pattern elements are tagged on a conventional English keyboard and the keyboard management program is revised, the characters can be inputted with the pattern element based input method of the present invention.

The pattern elements themselves are a number of simple structured graphical structures. The complicated structures can be decomposed into a combination of simpler structures. Therefore, the present invention can also be applied to input some graphical symbols. For example, the symbol for capacitor "⊥⊤" consists of two parts "⊥" and "⊤". "⊥" can be decomposed into "⌐" and "ㄴ", and "⊤" can be decomposed into "⌐" and "⌐". First inputting "⌐ ㄴ" and then inputting "⌐ ⌐", the symbol "⊥⊤" is inputted. Symbol "→" can be decomposed into "— >". Symbol "<" can be decomposed into "< ⌐". Symbol "△" can be decomposed into "∧ —". Complicated structures can be represented by some of their characteristics pattern elements, only if there is no duplication code in the set to which the structure belongs. To input a symbol, we only need to type in its corresponding pattern elements.

Through decomposition and simplification, the symbols frequently used in electronic schematic diagrams are coded as a series of pattern elements. The correspondence relationship between these symbols and pattern elements is illustrated as follows:

| Symbols | Representative pattern elements | Symbols | Representative pattern elements |
|---|---|---|---|
| ⊣⊢ | ⌐ ⌐ | ⊥ | ⊥ ⌐ |
| ⊣⊙⊢ | ⊣ ⊡ ⊢ | ⊥ | ⊥ ⌐ |
| ⊸⊶ | — ⊡ — | ○ | ○ |
| ⊸⊶ | ⌐ ᵥ ㄴ | ) | ( |
| ⊸⊱ | ⌐ > ⊢ | ᵥ | ᵥ |
| ⊀ | ⌐ < ⌐ | ⋆ | ⊥∧ㄴ |
| ⊀ | ⌐ < ⌐ | ⋆ | ⊥∧⌐ |

Other structures, such as block diagram, flow diagram can also be inputting in a similar way.

ADVANTAGES OF THE INVENTION

Compared with the conventional computer keyboard and other currently used methods, the pattern element based input method and the corresponding keyboard have the following advantages:

1. The keyboard has fewer keys and is easy to use and remember. The positions of the 13 pattern element keys on the keyboard is easy to remember, easy for one-handed typing, easy to locate, suitable for typing without looking at the keyboard, and suitable for pocket-size computer. The keyboard and the method can also be applied to electronic recording card, game machine, telephone apparatus, it is also convenient for remote-controlled operation.

2. The keyboard can be used for inputting characters of several different languages without altering the symbols tagged on the keys.

3. It has flexibility of combination, suitable for the requirement in the development of computer. Combined keystriking is one of the special features of the invention. If 13 pattern element keys are used, there will be more than 8000 combinations. This is sufficient to meet the requirement of future development of computers. Some combination of the pattern elements can be used to construct characters (such as 日 冂 入 etc., They can be used as command symbols. It is simple and easy to remember.

4. The Method is suitable for inputting graphical symbols, the pattern elements in elementary pattern set can be used to construct more complicated graphical symbols. So some commonly used regular graphical symbols can be coded and inputted intuitively. But on a conventional keyboard, it is very difficult to achieve.

5. The design provides a systematic, complete, easy to learn and easy to use method for the input of Chinese character and the corresponding keyboard is flexible, light weight and small sized. Compared with other currently used Chinese character input methods, the present invention has the following advantages:

(1) The patterns and letters are regularly structured and so easy to remember. There are too many parts of Chinese characters their structures are complicated and not easy to remember. The 21 pattern elements and 56 letters according to the invention are very simple, regular, symmetrical and easy to remember. 32 letters relate to eight aspects of our daily life. So it is not very hard to remember them through association.

(2) The method can be used to code characters more accurately and comprehensively. There are 110 independent code units (including the symbol ⌐ of the invention. The form and structure characteristics of Chinese characters can be coded accurately and comprehensively. It can not only input Chinese characters without duplication codes, but can also be used to construct new Chinese characters. The currently used method based on combination of character parts uses one letter to represent several Chinese character parts. The information about the difference among the structure of these parts is lost. So the duplication code rate is bound to be high.

(3) The method is easy to learn and the users can make progress in a step by step manner. The invention includes the following methods: pattern element based input method, letter based input method and character root based input method, users can learn these methods from the simple ones to the sophisticated ones. The sophisticated method is based on the simpler ones and the methods are closely related to each other. All users, beginners or professionals on different levels will find the most suitable method for themselves.

(4) The combination is flexible and efficient—There are 13 pattern element keys on the keyboard. For one-handed operation, at most five keys can be struck simultaneously. The number of combinations of the five keys is 2379. Now, only 114 of them have been used and the rest, over two thousand of them, remain undefined. Therefore, there is plenty of room for defining codes for more character parts and characters. These undefined combinations make it possible for future expansion of character set or character part set, thus provide a good foundation for fast Chinese character input.

(5) The method is suitable for both phonetic coding system as well as structure coding system. With this method, both the structure code and phonetic code of Chinese character can be inputted.

If a single code is assigned for each consonant, compound vowels and intonation, it is possible to input Chinese characters quickly by phonetic coding method.

(6) A new gesture language can be developed—when the position of pattern elements is fixed, each character corresponds to a definite gesture (the hand gesture for striking the keys to input the character). This gesture language can he used to exchange information in some cases.

BRIEF DESCRIPTION OF THE DRAWINGS

FIG. 4 is the outside view of the keyboard for IBM-PC computer.

FIG. 5 is a schematic circuit diagram of keyboard for IBM-PC computer.

FIG. 6 shows the arrangement of keyboard for two-hand typing on an IBM-PC computer.

DETAILED DESCRIPTION OF THE PREFERRED EMBODIMENTS

Figure 2:
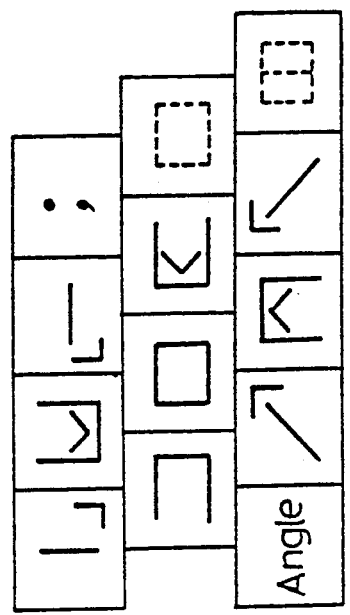
FIG. 2 shows the arrangement of the basic pattern element keyboard with its rows of keys shifted to each other.
Figure 1:
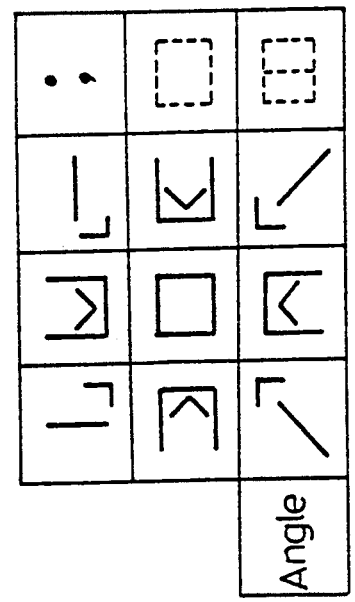
FIG. 1 shows the arrangements of the basic pattern element keyboard.

Practical examples of the present invention will be described with reference to the corresponding illustrations as follows:

FIG. 1 shows the layout of pattern element keyboard of the present invention, the keys are carefully arranged so that the symbols on the keys are symmetrically located which makes the locating of keys very easy. FIG. 2 shows, on the basis of FIG. 1, that each row of keys is shifted for half of the key-width to the right, and the "angle key" is placed on the leftmost position of the bottom row. This arrangement is helpful to the operation of pressing down simultaneously two adjacent keys in adjacent rows, and is convenient for one-handed operation.

Figure 3:
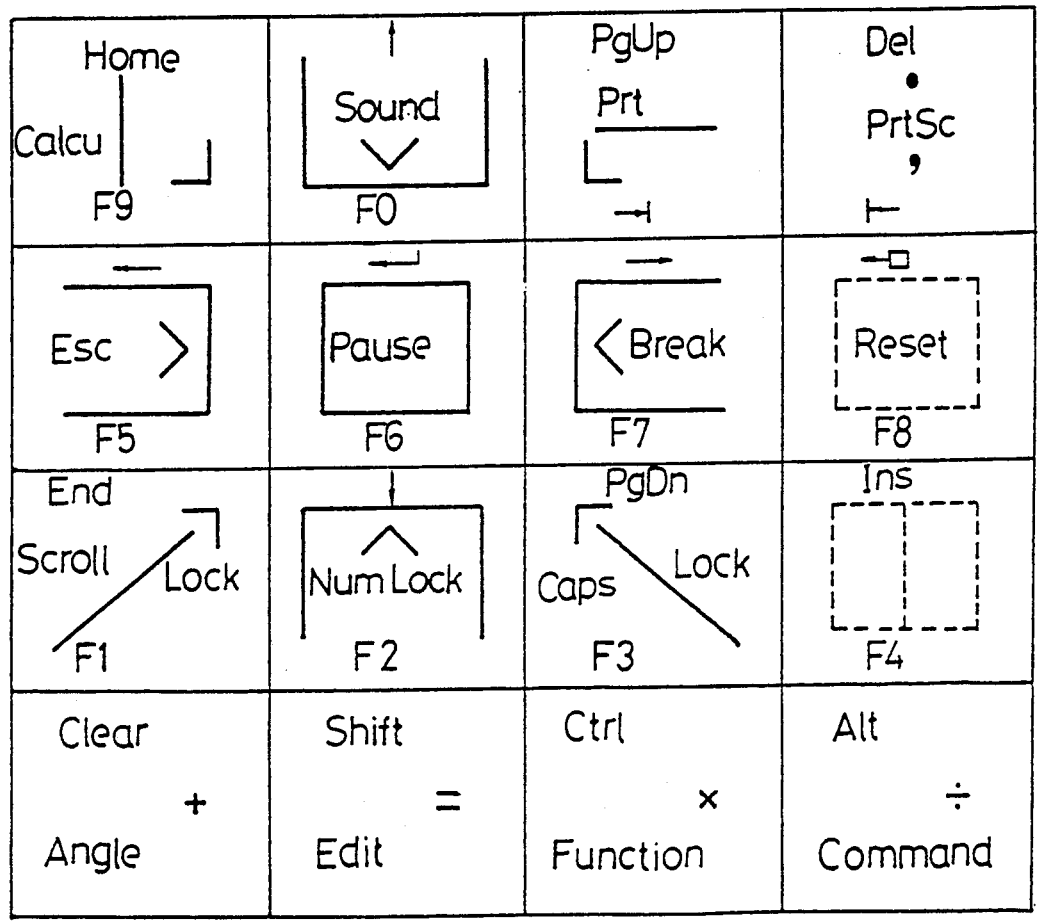
FIG. 3 shows the arrangement of keyboard designed for IBM-PC computer.
Figure 7:
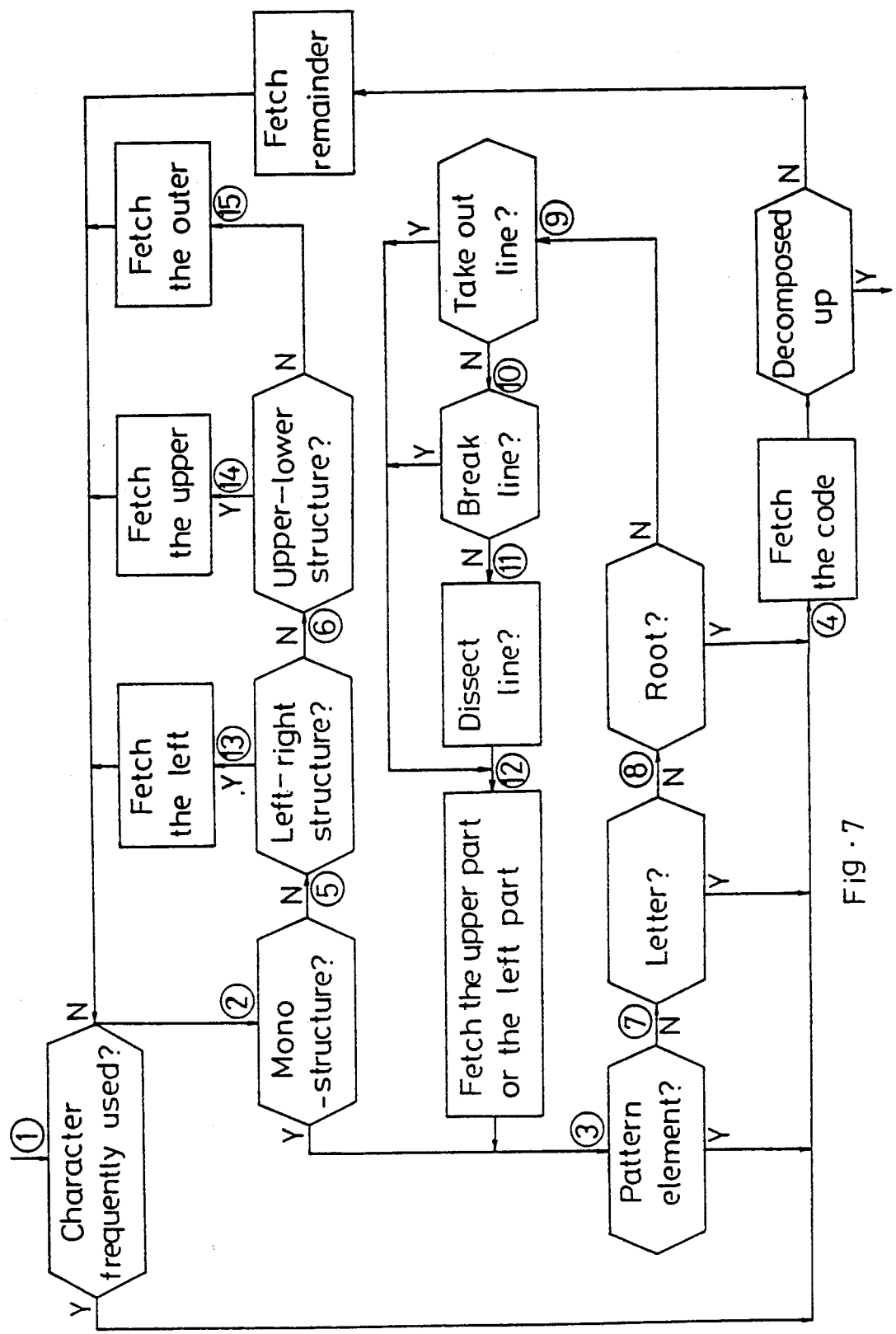
FIG. 7 is a program flow chart of decomposition process and code fetching of Chinese characters.

FIG. 3 shows the arrangement of keyboard for IBM-PC computer. It has only 16 keys, yet has the complete functions of the original keyboard (83 keys), and can be connected directly to a PC computer for operation. Besides the above-mentioned 13 keys, there are 3 additional keys added to the keyboard, i.e., one "edit" selection key, one "function" selection key and one "command" selection key. And to each pattern element key there has been added 3 additional symbols, namely, one edit symbol, one function symbol and one command symbol. When the "edit" selection key is pressed down simultaneously with a pattern element key, the keyboard will output a corresponding edit code. When the "function" selection key is pressed down simultaneously with a pattern element key, the keyboard will output a corresponding function (F0–F9) code. When the "command" selection key is pressed down simultaneously with a pattern element key the keyboard will output a corresponding command code.

Each selection key has three functions: "angle selection" key also has the function of "clear" "addition calculation"; "edit" selection key also has the function of "shift" and equal-sign; "function" selection key also has the function of "ctrl" and multiplication calculation; and "command" selection key also has the function of "Alt" and division calculation. When the key of "clear" is pressed, the last inputted pattern element is cleared. It is useful to correct mistyping. Pressing the "shift" key, followed by typing a character, the keyboard will output a shift code followed by the character code. If the keyboard is in a "capital letter" state, it will output small letter code, and vice versa. Pressing the "Ctrl" key, followed by typing a character, the keyboard will output a "Ctrl" code followed by the character code. Pressing the "Alt" key, followed by typing a character, the keyboard will output a "Alt" code followed by the character code.

If "Calcu" command is inputted, the keyboard will be returned to "calculator" state. In this state, combined key striking is unnecessary. Each key corresponds to an operator or a numeral; the function keys are used as numeral keys (for example, F1–F9 represent numeral 1–9) pattern element "−" represents a minus sign, and pattern element "." represents a decimal point.

"Second" command makes the keyboard produce a big sound after a character is inputted.

Symbol "⏎" represents return, and symbol "←□" functions as a Backspace key.

FIG. 4 is the outside view of the keyboard for IBM-PC computer, 16 keys arranged in a 4×4 array, and the keyboard is connected to the computer by a five-pin cable. The five-pin plug can be inserted in the keyboard interface socket on IBM-PC computer. This keyboard has all the functions of an IBM-PC computer keyboard (83 keys) and can be used as a substitute of the original keyboard.

FIG. 5 is a schematic circuit diagram of the keyboard. The most important part of the circuit is a single-chip micro processor (8749) and the function of interface 1 is keyboard scanning. The four most significant bits of interface 1 successively and cyclically output three "1" signals and one "0" signal. The four least significant bits of interface 1 read in the state of 16 keys. "0" will be read when a key is pressed and when released, "1" will be read. The state of the 16 keys can be represented by 16 binary bits. The number of 0's is the number of keys pressed down. The positions of "0" expresses the positions of the keys being pressed. The monitor program of the micro processor will convert the key state codes into IBM-PC key position code and then send it to interface 2 as serial code. The output of P21 is serial key position code; the output of P20 is synchronous clock signal. In order to enhance the driving capability, both of them are outputted by driver 7404. T1 is connected to the clock host machine. When the host machine requests the keyboard type the micro processor in the keyboard reads in the state of T1 and sends the keyboard information to the host.

Figure 6:
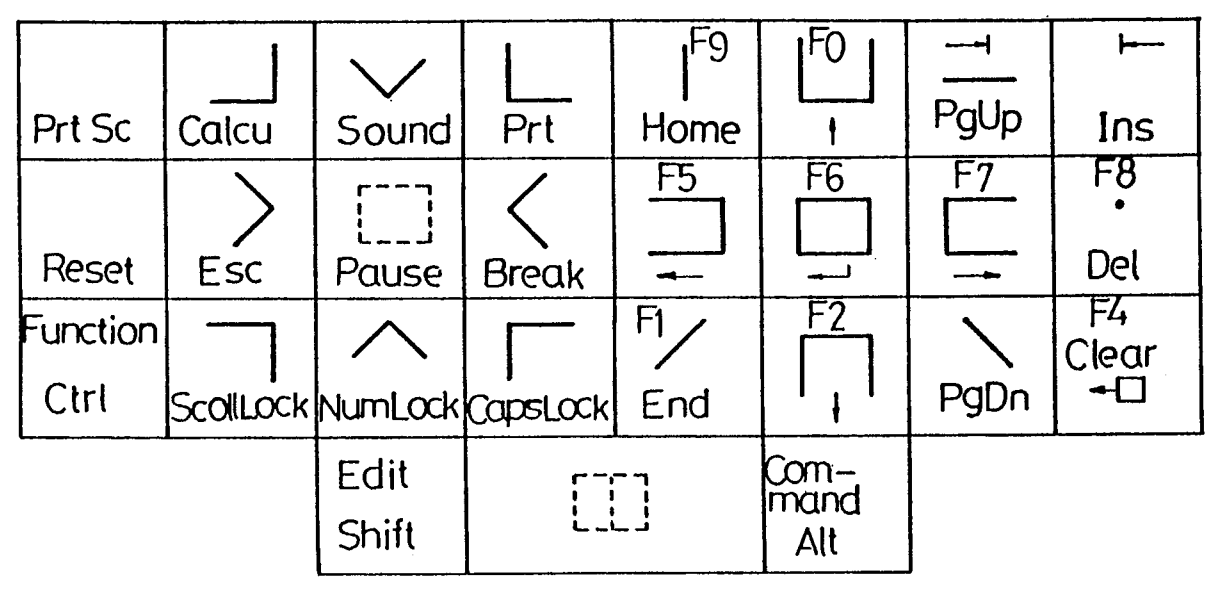

FIG. 6 shows the keyboard for two-handed operation on IBM-PC computer. It has 27 keys. "□" key is designed as a bar, suitable for combined key-striking. To strike the keys with both hands can increase the speed of typing, especially when the typing is performed on desk top.

The Greek alphabets can be regarded as an independent character set. It is difficult to distinguish the Greek characters "Δ" and "0". To avoid being decomposed into identical code, "Δ" should be decomposed into "Λ" and "—" instead of "Δ", thus duplication code of "Δ" and "0" can be avoided. "Φ" and "Ψ" can be decomposed by the method of "line taking out" and the other characters can be decomposed by the method of "line dissecting". The results obtained are as follows:

| | | | | |
|---|---|---|---|---|
| A | ⎯⎯ | □⊓ | B | ⎯⎯ □⊡ |
| Γ | ⎯⎯ | ⌐ | Δ | ⎯⎯ Λ — |
| E | ⎯⎯ | ⊂⊡ | Z | ⎯⎯ ⏋⌊⊡ |
| H | ⎯⎯ | ⊔⊓ | Θ | ⎯⎯ □⊔⊓ |
| I | ⎯⎯ | ⊐⊏⊡ | K | ⎯⎯ I< ⊡ |
| Λ | ⎯⎯ | Λ | M | ⎯⎯ Λ ⊡ |
| N | ⎯⎯ | Λ V ⊡ | Ξ | ⎯⎯ ⊔⊓⊡ |
| O | ⎯⎯ | □ | Π | ⎯⎯ ⊓ |
| P | ⎯⎯ | □⌐ | Σ | ⎯⎯ ⌐⌊ |
| T | ⎯⎯ | ⏋⌐⊡ | τ | ⎯⎯ ⌐ |
| Φ | ⎯⎯ | □ I | X | ⎯⎯ V Λ |
| Ψ | ⎯⎯ | ⊔ I | Ω | ⎯⎯ □ — |

The Japanese Katakana, after removing the hook stroke and transforming all angles to right angles, can be easily decomposed into pattern element strings as follows:

| Letters | Forms abstracted | Pattern elements | Letters | Forms abstracted | Pattern elements |
|---|---|---|---|---|---|
| ア | ア | ⏋/ | イ | イ | /I |
| ウ | ウ | ·⊓ | エ | エ | ⊐⊏ |
| オ | オ | —I/ | カ | カ | ⌐⊐⊓ |
| キ | キ | \—⊡ | ク | ク | ⌊⊓ |
| ケ | ケ | ⌊⊓⌐ | コ | コ | ⊐ |
| サ | サ | ⊔⊓ | シ | シ | ·/\ |
| ス | ス | ⏋·⊡ | セ | セ | ⊐⊏ |
| ソ | ソ | ·/ | ソ | ソ | □⊓ |
| タ | タ | ⊐⊏I | チ | チ | ·⊡/ |
| ツ | ツ | —⊡/ | ト | ト | I· |
| テ | テ | —/ | = | = | —⊡ |
| ナ | ナ | ⊐⌐ | ニ | ニ | ⏋I |
| ノ | ノ | / | ハ | ハ | /\ |
| ヒ | ヒ | ⌊⊏ | フ | フ | ⏋ |
| ヘ | ヘ | Λ | ホ | ホ | —I/\ |
| マ | マ | ⏋· | ミ | ミ | \⊡ |
| ム | ム | L· | メ | メ | VΛ |
| モ | モ | ⊐⊏⊡ | ヤ | ヤ | —\ |
| ユ | ユ | ⊐⌊ | ヨ | ヨ | ⊐⊡ |
| ラ | ラ | —⏋ | リ | リ | I⊡ |
| ル | ル | /⌊ | レ | レ | ⌊ |
| ロ | ロ | □ | ワ | ワ | ⊓ |
| ン | ン | ⊐⏋ | ヰ | ヰ | ·— |

Among them, "エ" and "＊" are duplication codes (they are decomposed into the same pattern string). If we define that the pattern string of "エ" ended with a "⊡" and "＊" without "⊡", the problem will be solved. Letters "ソ" and "ン" are difficult to distinguish. In order to eliminate duplication code, "\" is used to substitute ".", therefore its code is "./\".

Arabic letters can also be decomposed into pattern elements. To facilitate decomposition, they will first undergo a transformation process, that is, replace the curved line with straight line segments, but reserve its structure characteristics. For example, the letter "ψ" can be transformed to "ⵞ", and then it is easy to decompose it. The results of decomposition are shown as follows:

| Letters | Forms abstracted | Pattern elements | Letters | Forms abstracted | Pattern elements |
|---|---|---|---|---|---|
| ا | I | I | ي | ⵞ | ⊔· |
| ب | ⊔ | ·⊡⊔ | ق | ⊔ | ,⊔ |
| ت | ⊏ | —⊏·⊡ | ك | ⊏ | —⊏ |
| ث | ⊏ | ·—⊏ | ل | ⌐ | ⌐ |
| ج | ⌐ | ·⊐ | م | / | / |
| ح | / | ·/ | ن | w | V⊡ |
| خ | ẇ | 'V⊡ | ه | ⊔ | ⊔□ |
| د | ⊔ | ⊔⊡· | و | b | ⌊□ |
| ذ | b | ·⌊□ | ر | E | ⊏⊡ |
| ز | Ė | ·⊏⊡ | س | ⌊ | ·⌐□ |
| ش | ⌐ | ·⊡⌐□ | ص | ⌐ | ·⌐ |
| ط | ⌐ | ⌐ | ع | f | □I |
| ظ | V | ·V | غ | ع | ⊐□ |
| ف | ؟ | □⏋ | ر | ر | ⌐⊡ |

"·⊡" represents ".."; ",⊡" represents ",". On the right side of each letter, there is the corresponding pattern string code. During the process of input and code fetching. Some of the pattern elements can be ignored if only this will not cause duplication codes.

When we use the character root based input method, in accordance with the rule of "taking the bigger", we should first fetch the character roots, then the letters and finally the pattern elements, and arrange them according to the rule of first upper then lower, first left then right and first outer then inner.

For example, the character " 𡗗 " can be decomposed into three character roots " 𠂇土土 " and two letters "𠃌丁". According to the order of decomposition, they should be coded as " 𠂇土𠃌丁土 ".

" 圖 " can be decomposed into character root "土", letters " 丿乂 " and pattern elements "囗口". The outer hollow square 囗 should be represented by "囗". According to the order of decomposition the character " 圖 " should be coded as " 囗土口丿乂 ".

If the code length of each character is restricted to only four, we should select the first, second, third and last component in the code a string of components. So the code for " 𡗗 " will be " 𠂇土 丁土 " and the code for " 圖 " will be " 囗土 囗 乂 ".

When Chinese characters are inputted by letter, based input method, the codes for the character " 𡗗 " should be " 𠂇+— 𠃌丁+—", and the codes for "圖" should be " 囗+—囗 丿乂 ".

If the code length is restricted to only five, we should select the first, second, third, fourth and the last component out. So the code for " 𡗗 " of the full code, will be " 𠂇+— 𠃌丁 " and the code for "圖" will be " 囗+—囗 乂 ".

When Chinese characters are inputted by pattern element based input method, each Chinese character should be decomposed into pattern elements according to the normal writing order of the character. The code for " 𡗗 " should be "囗—|——𠃌.—|—|—" and the code for "圖" should be "囗—|—囗/|/\".

If the code length is restricted to only six, we should select the first, second, third, fourth, fifth and last component out of the complete code thus, the code for " 𡗗 " will be " 囗— | — 𠃌 — " and the code for "圖" will be "囗— | — 囗 \ ".

Since there is correspondence relations between strokes (and their combinations) and pattern elements and character letters, we can input characters on a pattern element keyboard. In practice, it is not so complicated as described above. If character root based input method is used, the characters will be decomposed according to its structure and the decomposition process should observe the normal writing order of Chinese characters. Meanwhile the input can be carried out by striking the relevant keys.

For example:

忡———口卩丁口      埃———土厶广大
衰———亠口亻乂     皑———白山己

The decomposition process for these characters by the character root based input method is shown as follows:

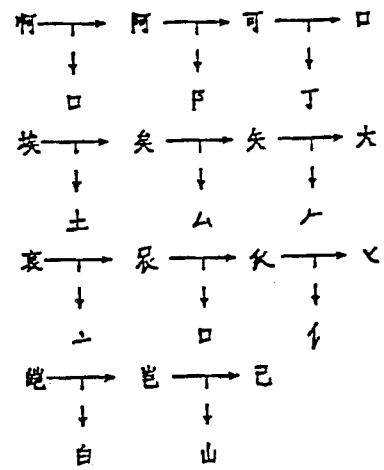

If the letter based input method is to be used, the above character roots should be further decomposed. If the pattern element based input method is to be used, then the character root and the character letter should be further decomposed into pattern elements.

It should be understood that the embodiments of the invention are only illustrative. They do not imply any restriction on the invention. The essential concepts and characteristics of the present invention are stated in the claims as follows.

I claim:

1. A keyboard input device for a user to input a plurality of characters and symbols, said characters and symbols each being represented by a combination of pattern elements after being decomposed by the user, comprising:

a plurality of keys for inputting said characters and symbols, said keys including pattern element keys each being tagged with at least one pattern element of a plurality of pattern elements, said plurality of pattern elements including at least

囗凵冂ㄣㄈ∨∧＜＞
⌐└ ㄱΓ — | ／ ＼ · ， means for converting a selection of keys selected by the user based on said combination of pattern elements into corresponding codes representative of the characters or symbols.

2. A keyboard input device according to claim 1, wherein said plurality of keys comprise:

ten pattern element keys being respectively tagged with ten groups of pattern elements, including 丩 凶 匚;彐囗𠃍 刀冈𠂉;

one space key tagged with ⌴ ;

one left-right structure key tagged with 𠕒; and one angle key for selecting particular elements of said groups of pattern elements on one of said keys.

3. A keyboard input device according to claim 2, wherein said plurality of keys further comprise:

a function key for outputting a corresponding function code in conjunction with one of said pattern element keys;

an edit key for outputting editing code in conjunction with one of said pattern element keys;

a command key for outputting command code in conjunction with one of said pattern element keys.

4. A keyboard input device according to claim 3, wherein said plurality of keys are arranged in a 4×4 matrix, said angle key, said function key, said command key, and said edit key being arranged in a bottom row of said matrix.

5. A keyboard input device according to claim 3, wherein the 4×4 matrix of keys comprises:
  a first row of four keys being tagged from left to right respectively with ⊔ ⋃ ⋓ ⊏ ;
  a second row of four keys being tagged from left to right respectively with ⊇ ◻ ⊂ ◻ ;
  a third row of four keys being tagged from left to right respectively with ⋀ ⋂ ⋉ ⋓ ; and
  a fourth row of four keys being from left to right respectively, said angle key, said edit key, said function key, and said command key.

6. A method for inputting a plurality of characters and symbols, comprising the steps of:
  a) providing a keyboard input device having a plurality of keys, said keys including pattern element keys each being tagged with at least one pattern element of a plurality of pattern elements, said plurality of pattern elements including at least

◻ ⊔ ⋂ ⊐ ⊏ ∨ ∧ < >
  ⌐ ⌙ ⌐ ⌐ − | / \ · ,  ;

b) decomposing one of said characters or symbols into a sequence of pattern elements based on planar space characteristics of the characters or symbols, observing a rule of first upper then lower, first left then right, first outer then inner, and in a hierarchical order of a character—a part of said character—a root of said character—a letter portion of said character—until said sequence of pattern elements is determined;
  c) inputting the sequence of pattern elements by selecting corresponding keys tagged with particular pattern elements of the sequence of pattern elements; and
  d) converting the sequence of pattern elements inputting into corresponding codes of said one of said characters or symbols.

7. A method according to claim 6, wherein said characters to be inputted each comprise an ASCII-code character, and the inputting step comprises the step of simultaneously inputting the particular pattern elements of the sequence of pattern elements representative of the ASCII-code character by simultaneously selecting the corresponding keys tagged with the particular pattern elements.

8. A method according to claim 6, wherein said characters to be inputted each comprise a Chinese character, said letter portion of said character comprises a combination of two pattern elements, and said inputting step comprises the step of typing in the two pattern elements simultaneously to input said letter portion, said letter portion comprising one of at least:

⊥ ¡ ⁄ ⟨  ⌐ ⌊ ⌐ ⌐  ⁄ ⁄ ⁄⁄ ⌐  ⌐⌐⌐⌐
⊥ ⊤ ⊣ ⊢  ⊞ ⊓ ≡ ⊟  ⊟ ⊟ ⊐ ⊏  ⊟ ⊥ ⊟ ⊟
⁺ ⁄ ⁄ ⊠  − ⊪ ⌐ ⌐  ⊥ ⊥ ⊥ ⊓  ⊤ ⊠ ⁄ ⌐
⊟ ⊟ ⊏ ⌐  ⌐ ⌐ ⌐ ⌐

9. A method according to claim 6, wherein said characters to be inputted each comprise a Chinese character, said root of said character comprising a combination of two or more pattern elements, and said inputting step comprises the step of typing in simultaneously the two or more pattern elements representative of the root to input said root, said root comprising one of at least:

王女亻立 心弖扌匚. 辛门弓攵 马丝信灬

金贝禾艹 日土石雨. 永火西月 大小四白

10. A method according to claim 6, wherein said character comprises a frequently used character being represented by one or more pattern elements, and said inputting step comprises the step of typing in the one or more pattern elements representative of the frequently used character simultaneously without decomposing said character according to step b).

11. A method according to claim 6, wherein said characters comprise characters of at least English, French, German, Russian, Greek, Arabic, Korean, Japanese, Chinese, and said symbols comprise at least electronic circuit diagrams, logic circuit diagrams, and program flowcharts.

* * * * *